United States Patent
Choi et al.

(10) Patent No.: US 11,448,494 B2
(45) Date of Patent: Sep. 20, 2022

(54) DEVICE AND METHOD FOR GENERATING GEOMAGNETIC SENSOR BASED LOCATION ESTIMATION MODEL USING ARTIFICIAL NEURAL NETWORKS

(71) Applicant: KOREA UNIVERSITY RESEARCH AND BUSINESS FOUNDATION, Seoul (KR)

(72) Inventors: Lynn Choi, Seoul (KR); Ho Jun Jang, Siheung-si (KR)

(73) Assignee: Korea University Research and Business Foundation, Seoul (KR)

( * ) Notice: Subject to any disclaimer, the term of this patent is extended or adjusted under 35 U.S.C. 154(b) by 1172 days.

(21) Appl. No.: 15/972,316

(22) Filed: May 7, 2018

(65) Prior Publication Data

US 2019/0049231 A1   Feb. 14, 2019

(30) Foreign Application Priority Data

Aug. 11, 2017  (KR) .................. 10-2017-0102335

(51) Int. Cl.
| | | |
|---|---|---|
| G01B 7/008 | (2006.01) | |
| G01B 7/14 | (2006.01) | |
| G06N 3/08 | (2006.01) | |
| G06N 3/04 | (2006.01) | |
| G01B 7/004 | (2006.01) | |

(52) U.S. Cl.
CPC ............ *G01B 7/008* (2013.01); *G01B 7/004* (2013.01); *G01B 7/14* (2013.01); *G06N 3/0445* (2013.01); *G06N 3/084* (2013.01)

(58) Field of Classification Search
CPC .......... G01B 7/008; G01B 7/004; G01B 7/14; G06N 3/0445; G06N 3/084; G01C 21/08; G01C 21/206; G01V 3/08
USPC ........................................................ 706/17
See application file for complete search history.

(56) References Cited

U.S. PATENT DOCUMENTS

| | | | |
|---|---|---|---|
| 11,250,318 B2* | 2/2022 | Foong | G06N 3/08 |
| 2014/0180589 A1* | 6/2014 | Kim | G01C 21/005 |
| | | | 702/5 |
| 2017/0259801 A1* | 9/2017 | Abou-Nasr | B60W 10/18 |

FOREIGN PATENT DOCUMENTS

| | | | |
|---|---|---|---|
| JP | 2017-83273 A | | 5/2017 |
| JP | 2017083273 A | * | 5/2017 |
| KR | 10-2011-0025025 A | | 3/2011 |

(Continued)

OTHER PUBLICATIONS

Ho Jun Jang, "Geomagnetic Field Based Indoor Localization Using Recurrent Neural Networks" IEEE GLOBECOM 2017—2017 IEEE Global Communications Conference Date of Conference: Dec. 4-8, 2017. (Year: 2017).*

(Continued)

*Primary Examiner* — Juan A Torres
(74) *Attorney, Agent, or Firm* — NSIP Law (57) ABSTRACT

A device that generates a location estimation model is provided. The location estimation model generator device includes a map generator part configured to generate a magnetic field map, which includes magnetic field values corresponding respectively to the coordinates of an indoor space; a data generator part configured to generate learning data by implementing the magnetic field map; and a learning part configured to generate a location estimation model by artificial neural network (ANN) learning implementing the learning data.

13 Claims, 9 Drawing Sheets

(56) References Cited

FOREIGN PATENT DOCUMENTS

| KR | 20150089366 A | * | 12/2012 |
| KR | 20140079919 A | * | 1/2014 |
| KR | 10-2014-0079919 A | | 6/2014 |
| KR | 10-2015-0089366 A | | 8/2015 |
| KR | 10-2016-0080842 A | | 7/2016 |

OTHER PUBLICATIONS

KR20170102335 "Trial Decision on Appeal against Decision to Reject Application (Translated)" date Feb. 1, 2021. (Year: 2021).*
KR20170102335 "Notice of Final Rejection (Translated)" dated Feb. 17, 2020 (Year: 2020).*
KR20170102335 "Request for the Submission of an Opinion (Translated)" date May 23, 2019 (Year: 2019).*
Choi, Lynn et al., "A Study on Indoor Location Recognition Based on Magnetic Field Using Deep Learning Technology", *National Research Foundation of Korea,* May 6, 2017 (5 pages in English and 3 pages in Korean).

\* cited by examiner

DEVICE AND METHOD FOR GENERATING GEOMAGNETIC SENSOR BASED LOCATION ESTIMATION MODEL USING ARTIFICIAL NEURAL NETWORKS

CROSS-REFERENCE TO RELATED APPLICATIONS

This application claims the benefit of Korean Patent Application No. 10-2017-0102335, filed with the Korean Intellectual Property Office on Aug. 11, 2017, the disclosure of which is incorporated herein by reference in its entirety.

BACKGROUND

1. Technical Field

The present invention relates to indoor location-based services, more particularly to a device and method for generating a location estimation model that can estimate the location of a user based on changes in the magnetic field value resulting from the movement of the user.

2. Description of the Related Art

In spite of the dramatic increase in demand for indoor location-based services, existing indoor positioning techniques based on RF signals have failed to provide satisfactory solutions to the desired performance requirements. Various localization techniques have been proposed, such as trilateration, fingerprinting, TDoA (time difference of arrival) that employ RF technology such as Wi-Fi, BLE (Bluetooth low energy), etc. With these techniques, however, the temporal instability of the transmitted signals, as well as problems associated with the attenuation, reflection, diffraction, etc., of the signals caused by indoor obstructions, may incur errors in the localization. There have been reports of errors reaching up to 2 to 5 meters in a laboratory environment and up to 10 meters or more in a large-scale indoor environment such as an airport and a shopping mall, revealing that such techniques are as yet insufficient in providing the required performance.

In an effort to resolve these problems, there have been attempts to improve performance by incorporating the pedestrian dead reckoning (PDR) technique using the IMU (inertial measurement unit) of a smart phone, but this has yet to provide satisfactory performance. Other techniques are being developed for improving localization performance that utilize various sensors such as ultrasound, camera, LED, and laser sensors, but these require expensive equipment or infrastructure.

An aspect of the present invention thus proposes a method that can recognize patterns associated with changes in the indoor magnetic field and estimate an indoor location with just a portable terminal such as a smart phone by using a recurrent neural network (RNN), which is one of the machine learning methods employed by artificial intelligence, to learn changes in the indoor magnetic field beforehand. An embodiment of the present invention can greatly enhance the accuracy of indoor localization while implementing a system with a low cost without requiring hardware equipment such as APs (access points), beacons, etc., as used in existing RF-based localization. As such, an embodiment of the invention is expected to radically improve both the performance and the cost of indoor localization.

SUMMARY OF THE INVENTION

An aspect of the invention is to provide a device and method for generating a location estimation model with which the location of a user can be estimated by using changes in a magnetic field value resulting from the movement of the user.

A device for generating a location estimation model (also referred to herein as a location estimation model generator device) according to an embodiment of the invention includes: a map generator part configured to generate a magnetic field map, which includes magnetic field values corresponding respectively to the coordinates of an indoor space; a data generator part configured to generate learning data by using the magnetic field map; and a learning part configured to generate a location estimation model by artificial neural network (ANN) learning using the learning data.

A method for generating a location estimation model according to an embodiment of the invention includes: a map generator part of a location estimation model generator device generating a magnetic field map from magnetic field values that correspond to the coordinates of an indoor space by using linear interpolation; a data generator part of the location estimation model generator device generating learning data by using the magnetic field map; and a learning part of the location estimation model generator device generating a location estimation model by recurrent neural network learning using the learning data.

A location estimation device according to an embodiment of the invention has the location estimation model generated by the method for generating a location estimation model stored therein and includes: a magnetic field sensor part configured to measure magnetic field values as the magnetic field values change according to the movement of a user within the indoor space; a location estimator part configured to estimate the location of the user by inputting a series of magnetic field values measured by the magnetic field sensor part into the location estimation model; and a location output part configured to output the location of the user estimated by the location estimator part.

The device and method for generating a location estimation model according to an embodiment of the invention make it possible to estimate the location of a user with high accuracy even in an environment that is not installed with expensive equipment or infrastructure.

Additional aspects and advantages of the present invention will be set forth in part in the description which follows, and in part will be obvious from the description, or may be learned by practice of the invention.

DETAILED DESCRIPTION OF THE INVENTION

Figure 1:
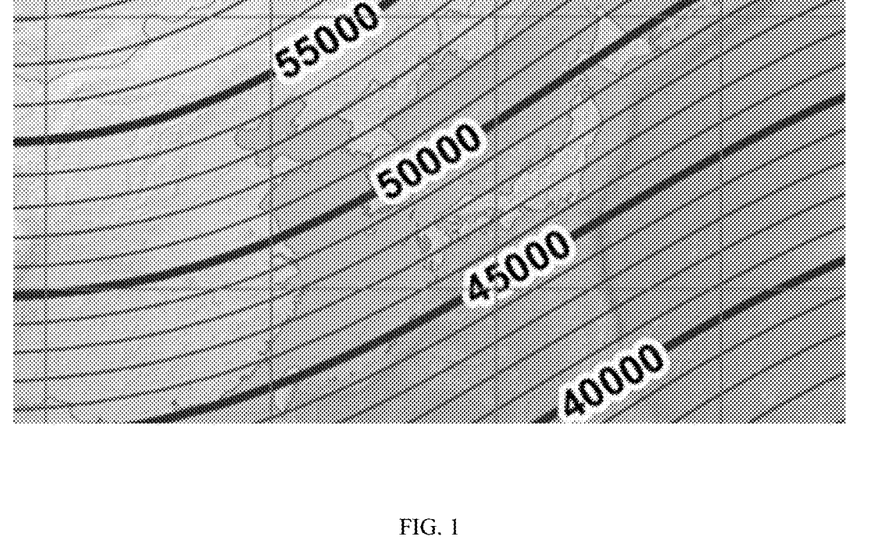
FIG. 1 illustrates the magnetic field distribution over a region of northeast Asia.

The geomagnetic field refers to the massive magnetic field flowing between the south magnetic pole and the north magnetic pole. The world magnetic field model provided for the year 2015 by the National Oceanic and Atmospheric Administration (NOAA) of the United States shows that the geomagnetic field is distributed differently in each region. According to FIG. 1, which illustrates the magnetic field distribution of the northeast Asian region, the Republic of Korea is located near the 50 μT (microtesla) band.

The differences in the distribution of geomagnetic field values for different regions are even more pronounced indoors. Reasons for this include the use of materials such as H beams in the structure of the building, as well as the influence of various building features such as steel entrances, elevator structures, electrical motors, etc., on the indoor magnetic field values. It was observed that the magnetic field values at an actual test site (lobby of the engineering building at Korea University) varied from 10 μT ~120 μT.

Figure 2:
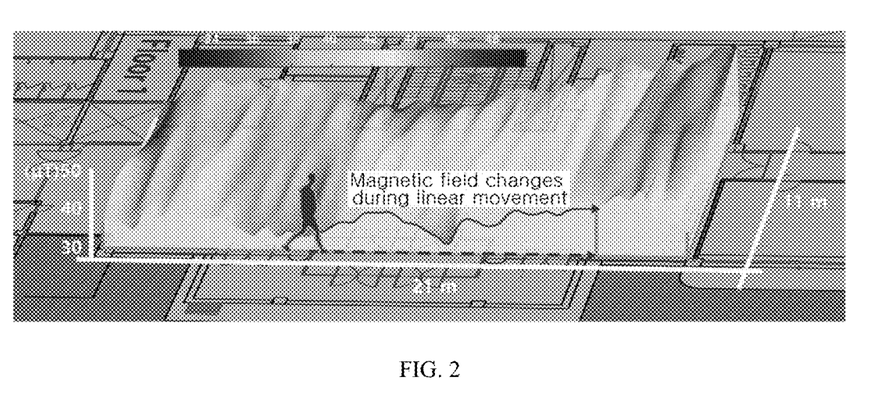
FIG. 2 is a diagram visually representing absolute values of magnetic vectors measured at a test site.

A geomagnetic field value is expressed as a vector in 3-dimensional space. Referring to FIG. 2, which is a diagram visually representing the absolute values of magnetic vectors measured at a test site, the movement of a pedestrian in an indoor space causes changes in the measured magnetic field values, and this movement can be visualized as contour lines on a magnetic field map. Also, when performing localization using a magnetic field, the following properties are to be considered.

1) There may exist several places within an indoor space that have the same magnetic field vector value. Thus, it would be difficult to determine the current location with just a single magnetic field vector value.

2) The movement of a pedestrian follows a continuous movement trajectory. This means that the location of the pedestrian at time t-1 does not differ greatly from the location of the pedestrian at time t and that the locations have continuous values. Thus, the location at the current time is affected by the location at the previous time.

3) Similar to the movement trajectory of the pedestrian indoors, the changes in magnetic field values are also continuous. That is, the difference between magnetic field values of adjacent locations is not great, and therefore the change in magnetic field values caused by the movement of a pedestrian also has a continuous property, just as a movement on contour lines.

In summary, the trend of changes in the magnetic field vector values detected according to the movement of the pedestrian can be expressed as curved waveforms, and since a greater length of continuous magnetic field vector values, i.e. a magnetic field vector value sequence, better provides a unique waveform pattern, the current location that can be estimated may converge to one spot.

An embodiment of the present invention aims to provide an accurate estimate of a location indoors by using a recurrent neural network (RNN) technique, a type of 'deep learning' technology, to input the trend of changes in the indoor magnetic field value. From among the various types of artificial neural networks (ANN's), the recurrent neural network (RNN) has a feedback loop from the output to the input. Therefore, the output result learned with the recurrent neural network (RNN) is determined not only from the current input value but also from all previous input values, making the recurrent neural network (RNN) suitable for use in indoor localization, in which the input and output data are mutually continuous along the time axis.

Figure 3:
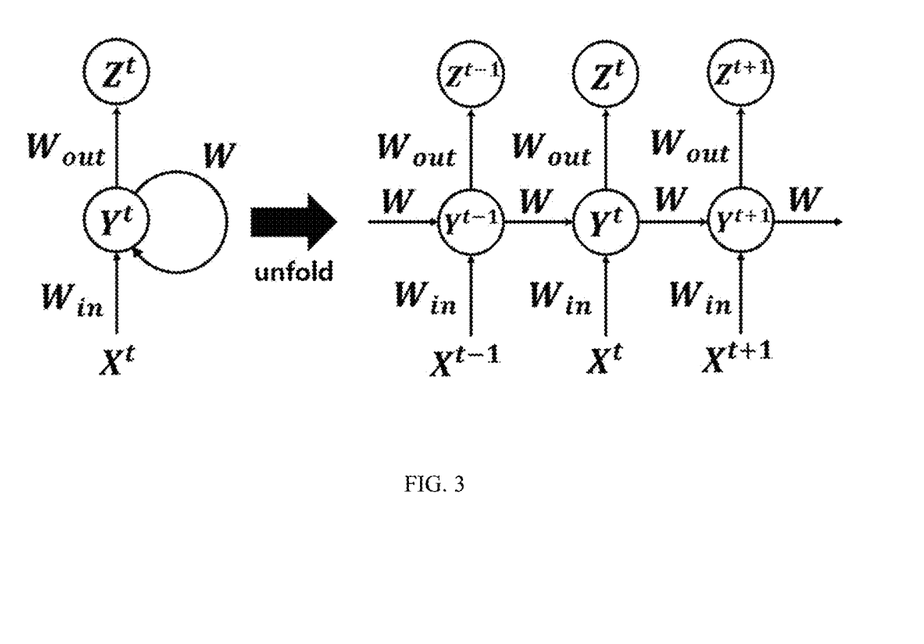
FIG. 3 illustrates the basic structure of a recurrent neural network (RNN) used in an embodiment of the present invention.

FIG. 3 illustrates the basic structure of a recurrent neural network (RNN) used in an embodiment of the present invention.

Let $W_{in}$ be a weight applied on a link from an input layer to a hidden layer, let W be a weight applied on a link from the hidden layer to the hidden layer, let $W_{out}$ be a weight applied on a link from the hidden layer to an output layer, let the 3-dimensional vector $(X_1^t, X_2^t, X_3^t)$ be an input of the recurrent neural network at time point t, let $Y^t$ be an output of the hidden layer at time point t, let the point $(Z_1^t, Z_2^t)$ in 2-dimensional space be the final output at time point t, let f be the activation function of the hidden layer, and let $f_{out}$ be the activation function of the output layer. Then, the output $Z_j^t$ of the recurrent neural network at time point t may be expressed as Equation 1 below.

$$X_j^t = f_{out}(W_{out}(f(W_{in}X_i^t + WY^{t-1})))  \ (i \in \{1,2,3\}, j \in \{1,2\}) \quad \text{[Equation 1]}$$

Figure 4:
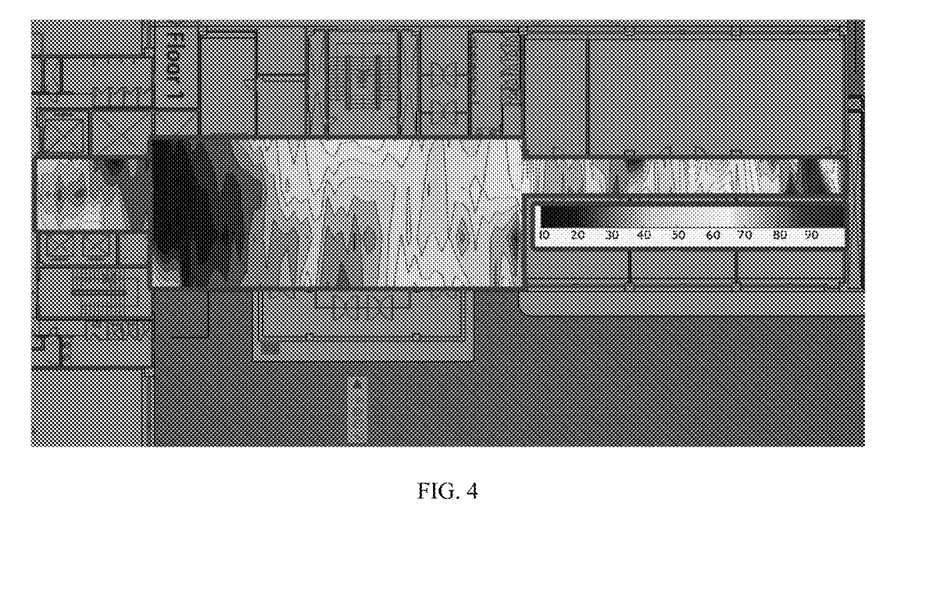
FIG. 4 is a diagram visually representing a generated magnetic field map.

An embodiment of the invention aims to establish a magnetic field-based artificial neural network optimized for indoor positioning that uses a magnetic field map to learn beforehand the patterns of changes in the magnetic field induced by the movement path of a pedestrian. A magnetic field map may involve measuring the magnetic field at reference points designated in certain intervals in an indoor space using a smart phone or magnetic field sensor capable of measuring the magnetic field and then arranging the measured magnetic field values and the actual coordinates in a single table. Here, a smaller interval between the measurement reference points would provide a higher accuracy of the localization, but would also increase the time and effort required for generating the magnetic field map. Thus, taking advantage of the phenomenon that the magnetic field increases or decreases linearly with distance, an embodiment of the invention can use linear interpolation to generate a magnetic field map of a high resolution by interpolating the magnetic field values for coordinates where no actual measurements were taken. FIG. 4 is a diagram visually representing a generated magnetic field map.

Figure 5:
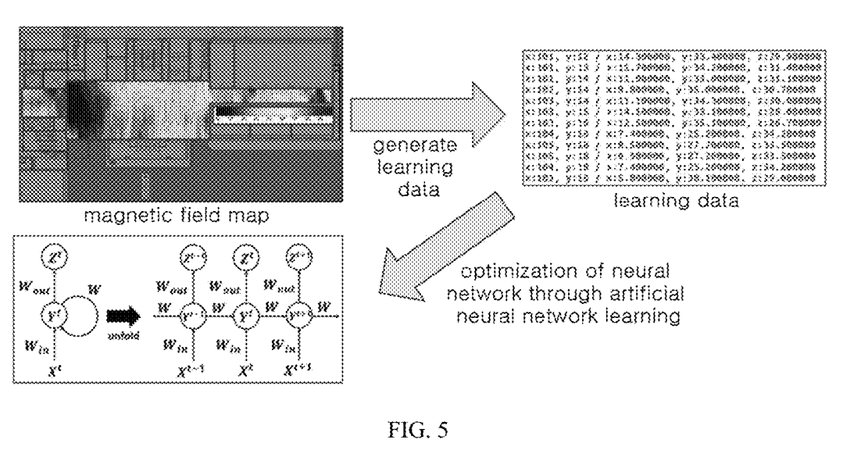
FIG. 5 illustrates the processes of generating learning data and neural network learning.

Indoor localization using deep learning requires optimizing the neural network beforehand through learning. To generate learning data for the neural network learning, the movement of the user may be generated virtually based on the magnetic field map. The generated virtual path may be composed of coordinates and magnetic field values mapped to the coordinates. Since the amount of learning data has a large impact on the performance of the indoor localization, a sufficient amount of learning data is to be generated, to allow a sufficient learning of the entire map. The time spent in generating the learning data can be greatly reduced by automating the process of generating learning data. An optimized neural network can be generated by inputting the magnetic field vector value of the generated learning data as the input value of the neural network, inputting the coordinates of the generated learning data as the output target value of the neural network, and proceeding with the learning of the magnetic field map for the neural network via a feed-forward process and a back-propagation process. The generating of learning data and the neural network learning process are illustrated in FIG. 5.

The processes for the neural network learning may be divided largely into a feed-forward process and a back-propagation process. In the feed-forward process, the three magnetic field vector values for the X, Y, and Z axes are inputted to the input layer, and a first order function is calculated with the weight applied for the hidden layers. Afterwards, the calculation result is subject to an activation function and the range of the calculation result is adjusted. While an embodiment of the invention uses a ReLU (rectified linear unit) function as the activation function, the scope of the invention is not limited with respect to the type of activation function. Since a neural network that has not achieved sufficient learning does not have an optimized weight for the hidden layers, the result outputted at the output layer may not match the originally targeted result. Such difference between the result outputted at the output layer and the originally targeted result is defined as learning error. In order to reduce the learning error, a back-propagation process may be performed. In the back-propagation process, the error signal at the output layer may first be calculated, using an error function. Although an embodiment of the invention may use a MSE (mean squared error) function as the error function, the scope of the invention is not limited with respect to the type of error function. Next, the weight for the hidden layers may be modified by way of a back-propagation weight update formula. In an embodiment of the invention, a gradient descent optimizer may be used. The procedures described above may be iterated to form an optimized neural network that converges to a minimum error rate.

A recurrent neural network is characterized in that the output result of the hidden layer computed at time t−1 is recurrently used at the time the subsequent computation times t and t+1, forming a correlative relationship at the output result. In 'TensorFlow,' a deep learning framework used in an embodiment of the invention, this is referred to as a 'state' and is processed as the input in the computation of the next unit time. Due to the feature described above, the recurrent neural network may be suitably utilized for indoor localization, of which a continuous path is a characteristic property.

Figure 6:
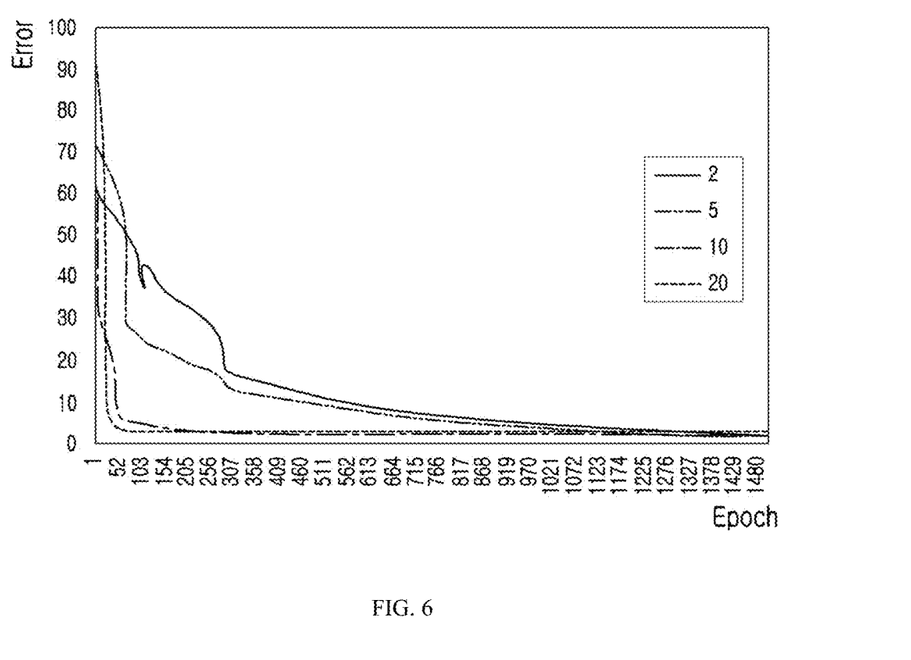
FIG. 6 is a graph representing the error according to number of epochs for different numbers of hidden nodes.

In the learning process of an artificial neural network, factors such as the number of hidden nodes of the hidden layer, the size of the mini-batches, the designated total number of epochs, and the learning rate value directly impact the learning result, and therefore, it is important to find optimal values for such factors in accordance with the properties of the learning data. According to an embodiment of the invention, the total numbers of epochs until the target error rate is achieved were compared while increasing the number of hidden nodes from 2 to 5, 10, and 20. The results are shown in FIG. 6. Referring to FIG. 6, it can be seen that the greater the number of hidden nodes, the smaller the number of total epochs until the target error rate is achieved.

Figure 7:
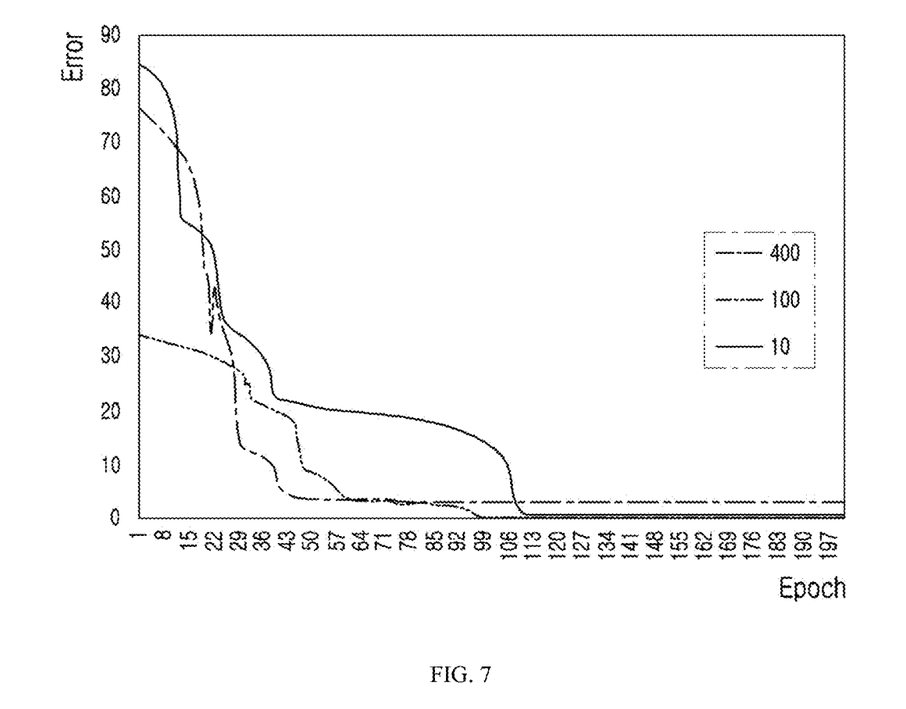
FIG. 7 is a graph representing changes in learning error rate for different sizes of the mini-batches.

If the overall data set of the learning data is formed as one batch in proceeding with the artificial neural network learning, the data first learned may be forgotten with an increased number of learning iterations by the neural network, and the problem of 'gradient explosion' may occur in which the gradient increases dramatically. Also, in cases where the 'TensorFlow' framework is used, as in an embodiment of the invention, the structural property of the 'TensorFlow' application may incur the problem of insufficient memory during the learning process if the test is performed with all neural networks formed beforehand for the entire batch size. To resolve these problems, an embodiment of the invention may use mini-batches, with the overall data set reconfigured into units of a smaller batch size, so that the batch normalization process may be performed with learning the smaller units. It was observed that increasing the size of the mini-batches results in an increased speed in converging to the minimum error rate but also results in an increase in the converging error rate. The changes in learning error rate according to the size of the mini-batches are represented in FIG. 7.

The optimized value of the neural network may differ according to the size and resolution of the magnetic field map, and the optimal performance for indoor localization can be achieved by adjusting the error rate via substituting the values of several parameters to obtain an optimized neural network suitable for the actual environment.

To evaluate the learned neural network, i.e. the location estimation model, the localization can be performed with evaluation data inputted to the optimized neural network. The X, Y, and Z magnetic field values (or evaluation data) measured at magnetic field sensors can be entered as input values to the neural network, after which the current coordinates can be outputted via the feed-forward process of the neural network, and by using the properties of the neural network, the continuous localization result of the next unit time can be outputted. With actual localization, it may not be possible to calculate an error function since the current location is not known, and as such, the back-propagation process for optimizing the neural network may not be performed.

Figure 8:
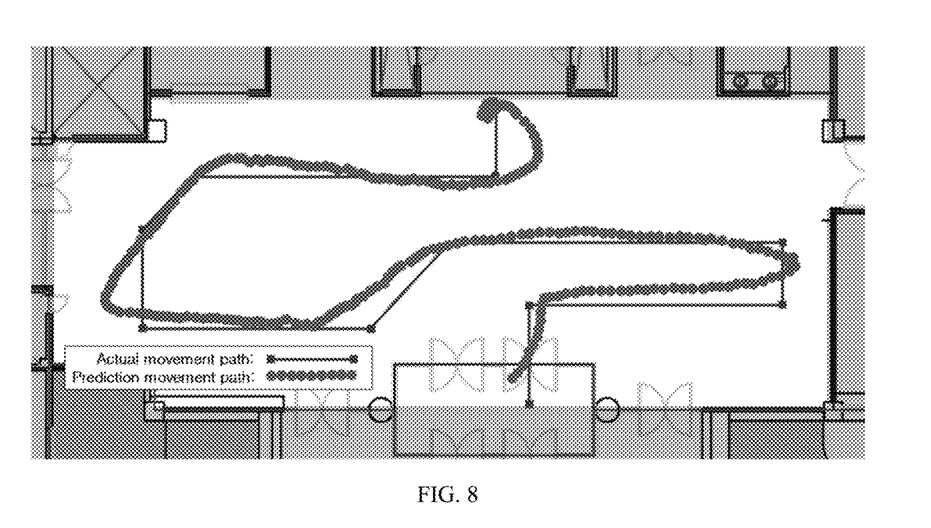
FIG. 8 illustrates the results of localization using evaluation data.

A simulation performed using learning data generated after setting the number of hidden nodes to 20, the learning rate to 0.001, and the batch size to 200 shows localization errors of minimum 0 m, maximum 2.091 m, and average 1.256 m. The results of the localization using evaluation data are illustrated in FIG. 8.

Figure 9:
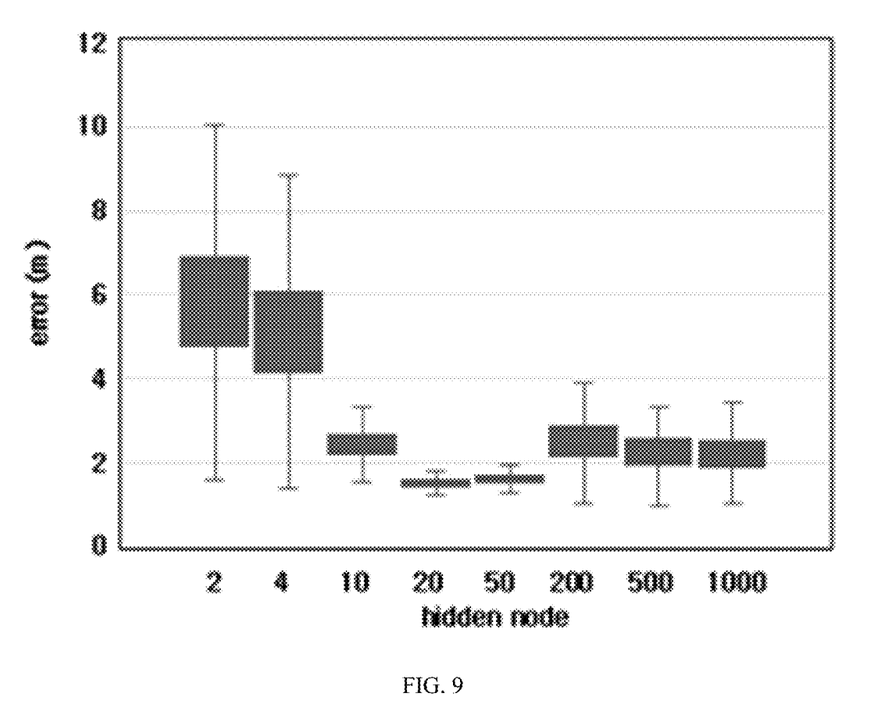
FIG. 9 is a graph representing the performance results of localization for different numbers of hidden nodes.

Further to the single simulation, additional simulations were performed, increasing the number of hidden nodes from 2 to 4, 10, 50, 200, 500, and 1000, and the results show a trend of improved performance in the localization for a greater number of hidden nodes, but it was observed that, with cases using 200 or more hidden nodes, the localization error was slightly increased. Table 1 and FIG. 9 show the results of localization performance according to the number of hidden nodes when five different sets of learning data and evaluation data were used. In FIG. 9, the wider boxes for each plot represent the range in which 80% of the overall localization samples are present, whereas the bars extending therefrom represent the range in which 99% of the samples are present.

TABLE 1

| Number of Hidden Nodes | Minimum Error (m) | Average Error (m) | Maximum Error (m) |
|---|---|---|---|
| 2 | 0 | 5.815 | 10.587 |
| 4 | 1.077 | 5.159 | 11.044 |
| 10 | 0.777 | 2.419 | 3.337 |
| 20 | 0.781 | 1.498 | 1.814 |
| 50 | 0.974 | 1.594 | 1.937 |
| 200 | 0.08 | 2.497 | 3.879 |
| 500 | 0.058 | 2.251 | 3.356 |
| 1000 | 0.085 | 2.204 | 3.656 |

Figure 10:
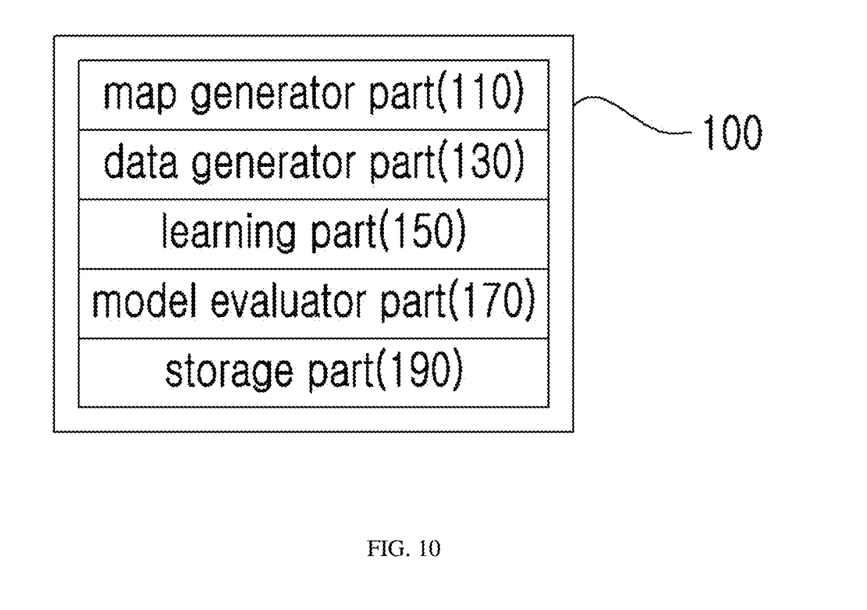
FIG. 10 is a functional block diagram of a location estimation model generator device according to an embodiment of the present invention.

FIG. 10 is a functional block diagram of a location estimation model generator device according to an embodiment of the present invention.

The location estimation model generator device 100, which may also be referred to as a location estimation model generator server, can generate a magnetic field map that includes information relating to the magnetic field distribution within a particular indoor space and can generate an optimized location estimation model by learning of a location estimation model using the generated magnetic field map and learning data. The location estimation model generator device 100 may include a map generator part 110, a data generator part 130, and a learning part 150. In some embodiments, the location estimation model generator device 100 can further include at least one of a model evaluator part 170 and a storage part 190.

The map generator part 110 can generate a magnetic field map that includes magnetic field distribution information for the coordinates of the indoor space for which the location estimation is to be performed. The magnetic field map can be implemented in the form of a table that includes the coordinates of each reference point of the indoor space designated in particular intervals as well as the magnetic field values corresponding to the coordinates.

The magnetic field value at each reference point can be measured by using a magnetic field sensor, implemented for example on a smart phone, etc., and the measured magnetic field values can be transferred over a certain input interface or over a wired or wireless communication network to the map generator part 110 of the location estimation model generator device 100.

Also, the map generator part 110 can increase the resolution of the generated magnetic field map by using a particular algorithm, such as, for example, linear interpolation. That is, it is possible to generate a magnetic field map with a high resolution by using the linear interpolation method to interpolate the magnetic field values at points where the magnetic field values were not measured directly.

The data generator part 130 can generate the learning data used for the learning and/or evaluation of the location estimation model. In one example, the data generator part 130 can generate a virtual path in the indoor space for which the location estimation is to be performed. The virtual path can include the coordinates of each point included in the virtual path and the magnetic field value mapped to each point. The set of the coordinates of the continuous points included in the virtual path and the magnetic field values mapped to the points can be considered as the learning data.

Here, if the learning for the location estimation model, i.e. the recurrent neural network, is conducted with the entire learning data set configured as a single batch, the data learned first may be forgotten with increased learning iterations of the recurrent neural network, and the problem of gradient explosion may occur. Therefore, the data generator part 130 can divide the overall learning data into a multiple number of mini-batches having a predetermined batch size. In this case, the learning for the recurrent neural network can be performed using the learning data divided into multiple mini-batches.

The learning part 150 can generate an optimized recurrent neural network, i.e. the location estimation model, by the learning of an artificial neural network (ANN), particularly a recurrent neural network (RNN), using the learning data generated by the data generator part 130. To be more specific, the learning part 150 can input the magnetic field values included in the learning data, which is generated by the data generator part 130 by way of a feed-forward process, into the input layer of the recurrent neural network to obtain the output coordinates corresponding to the inputted magnetic field values. Also, the learning part 150 can modify the weight of the hidden layers forming the recurrent neural network via a back-propagation process by using the errors between the outputted coordinates and the coordinates included in the learning data, i.e. the target values. By iterating the learning process using the learning data having continuous magnetic field values and continuous coordinate values, the learning part 150 can generate an optimized recurrent neural network converging to the minimum error rate or target error rate. The optimized recurrent neural network can also be referred to as a location estimation model.

The model evaluator part 170 can evaluate the error rate of the location estimation model learned by the learning part 150 by using a portion of the learning data generated by the data generator part 130, i.e. the evaluation data. With actual localization, it may not be possible to calculate an error function since the current location is not known, and as such, the back-propagation process for optimizing the neural network may not be performed. Therefore, the model evaluator part 170 can input the continuous magnetic field values included in the evaluation data into the location estimation model to obtain their corresponding coordinate values. By comparing the error between the outputted coordinate values and the coordinate values included in the evaluation data, the error rate of the location estimation model can be evaluated. In certain embodiments, the evaluation data can be generated separately by the data generator part 130. Here, the process for generating the evaluation data can be the same as the process for generating the learning data.

The storage part 190 can store data that is used or generated during the process of generating the location estimation model, the recurrent neural network algorithm, the optimized location estimation model, and the like.

The location estimation model generator device 100 illustrated in FIG. 10 can be implemented in the form of a computing device such as a server, PC (personal computer), tablet PC, laptop, etc. Further descriptions regarding the computing device are provided later with reference to FIG. 14.

Figure 11:
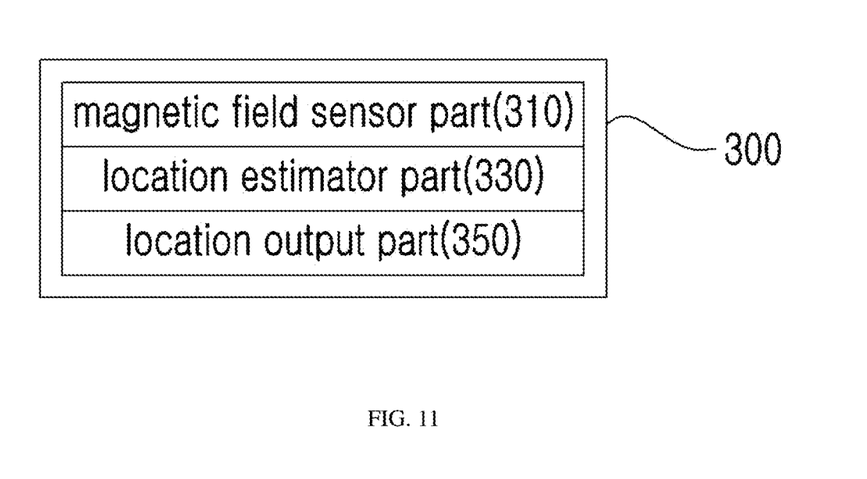
FIG. 11 is a functional block diagram of a location estimation device according to an embodiment of the present invention.

FIG. 11 is a functional block diagram of a location estimation device according to an embodiment of the present invention.

The location estimation device 300 can be implemented in the form of a computing device on which the location estimation model generated by the location estimation model generator device 100 is stored. A more detailed description regarding the computing device is provided later with reference to FIG. 14. The location estimation device 300 can execute an install file after obtaining the install file over a wired or wireless communication network directly from the location estimation model generator device 100 or downloading the install file via at least one relay server, such as, for example, an app store server (application store server), to install the location estimation model onto the location estimation device 300. Thus, it is obvious that the location estimation device 300 and the location estimation model generator device 100 can also include a communication interface for performing communication functions.

The location estimation device 300 can include a magnetic field sensor part 310, a location estimator part 330, and a location output part 350.

The magnetic field sensor part 310 can measure the magnetic field values periodically at predetermined time intervals as the magnetic field values change according to the movement of the user carrying the location estimation device 300 within the indoor space. Thus, a series of magnetic field values can be outputted from the magnetic field sensor part 310.

The location estimator part 330 can estimate the location of the user by using the magnetic field values outputted from the magnetic field sensor part 310 as input values for the location estimation model. The location estimation model used by the location estimator part 330 can be an optimized artificial neural network generated by the location estimation model generator device 100 illustrated in FIG. 10. In the indoor space, the magnetic field values can be the same at several locations. However, the movement path corresponding to the continuously changing magnetic field values converges to one, so that even though the output value of the location estimator part 330 for the initial magnetic field value, i.e. the output coordinates, may not match the actual location of the user exactly, the output values of the location estimator part 330 after the input of a continued series of magnetic field values may lie within a relatively small error range with respect to the actual location of the user.

The location output part 350 can provide the location of the user estimated by the location estimator part 330 via a particular display device to the user. For instance, the location output part 350 can display the estimated location of the user or the estimated movement path of the user on at least a portion of a map of the indoor space for which the location estimation is to be performed.

The location estimation device illustrated in FIG. 11 can be implemented in the form of a mobile or portable computing device, such as a mobile phone, smart phone, laptop, net-book, e-reader, tablet PC, PDA (personal digital assistant), a navigation device, PMP (portable multimedia player), MP3 player, MP4 player, etc.

The components of the location estimation model generator device 100 illustrated in FIG. 10 and the location estimation device 300 illustrated in FIG. 11 can be differentiated in terms of function and logic, and it should be obvious to the person of ordinary skill in the art that such components may not necessarily be divided into separate physical devices or written as separate code. Also, the components of the location estimation model generator device 100 and the location estimation device 300 can be implemented as functional, structural combinations of hardware and software for operating such hardware or as certain code and logical units of hardware resources for executing such code to achieve the technical spirit of the invention. The components may not necessarily be physically connected code or a certain type of hardware.

Figure 12:
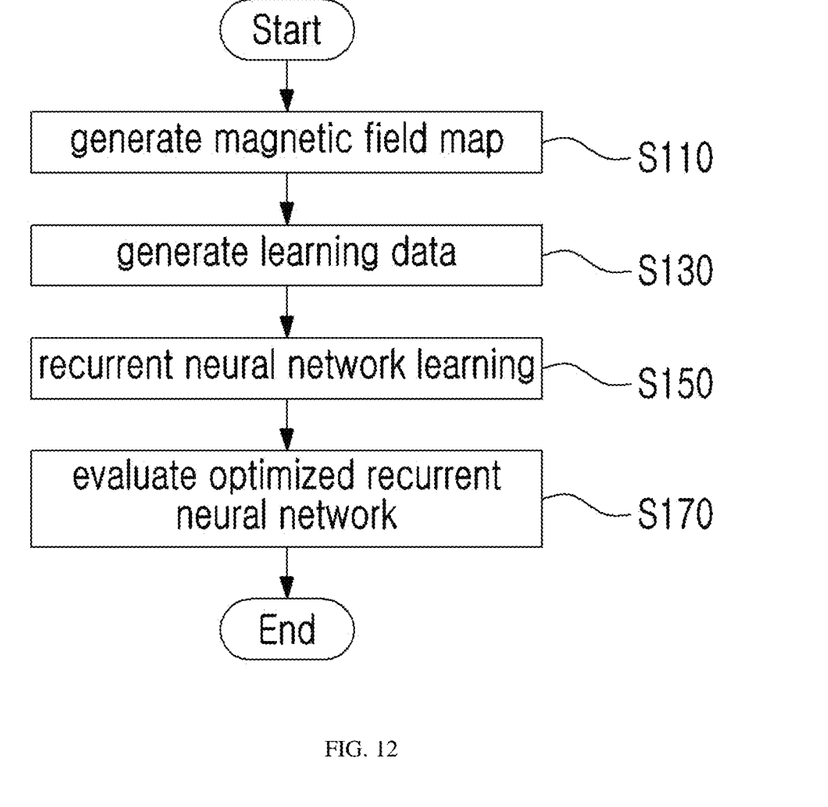
FIG. 12 is a flow diagram illustrating a method for generating a location estimation model performed by the location estimation model generator device shown in FIG. 10.

FIG. 12 is a flow diagram illustrating a method for generating a location estimation model performed at the location estimation model generator device shown in FIG. 10. In describing the method for generating a location estimation model, certain descriptions that are redundant from the foregoing descriptions are omitted.

First, the map generator part 110 of the location estimation model generator device 100 can generate a magnetic field map that includes magnetic field distribution information for the coordinates of the indoor space for which location estimation is to be performed (operation S110). In certain embodiments, the map generator part 110 can generate a magnetic field map of a high resolution by using a particular algorithm, such as linear interpolation, for example.

The data generator part 130 of the location estimation model generator device 100 can generate learning data used for the learning of the recurrent neural network (operation S130). In one example, the data generator part 130 can generate a virtual path in the indoor space for which the location estimation is to be performed. The virtual path can include the coordinates of each point included in the virtual path and the magnetic field value mapped to each point. In certain embodiments, the data generator part 130 can divide the learning data to a multiple number of mini-batches having a predetermined batch size. In this case, the learning of the recurrent neural network can be performed based on learning data divided into the multiple mini-batches.

The learning part 150 of the location estimation model generator device 100 can generate an optimized artificial neural network, i.e. the location estimation model, by way of the learning of the artificial neural network, particularly a recurrent neural network, using the learning data generated by the data generator part 130 (operation S150). More specifically, the learning part 150 can modify the weight of the hidden layers included in the recurrent neural network by using the errors between the coordinates outputted through a feed-forward process and the target coordinates in a back-propagation process. Also, the learning part 150 can iterate the learning process using learning data that includes sequential magnetic field values and sequential coordinate values, to generate an optimized recurrent neural network that converges to the lowest error or target error.

In certain embodiments, the method for generating a location estimation model can further include evaluating the location estimation model performed by a model evaluator part 170 (operation S170). That is, the model evaluator part 170 can use evaluation data to evaluate the error rate of the location estimation model learned by the learning part 150.

Figure 13:
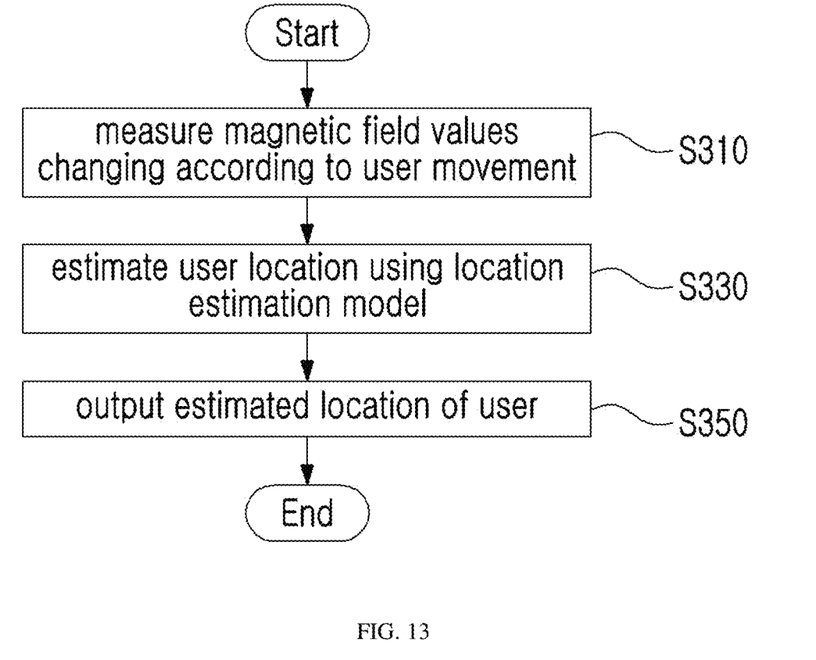
FIG. 13 is a flow diagram illustrating a method of location estimation performed by the location estimation device shown in FIG. 11.

FIG. 13 is a flow diagram illustrating a method of location estimation performed at the location estimation device shown in FIG. 11. In describing the method for estimating location, certain descriptions that are redundant from the foregoing descriptions are omitted.

First, the magnetic field sensor part 310 of the location estimation device 300 can measure magnetic field values periodically at predetermined time intervals as the magnetic field values change according to the movement of a user carrying the location estimation device 300 within an indoor space (operation S310). Thus, a sequence of magnetic field values can be outputted from the magnetic field sensor part 310.

The location estimator part 330 of the location estimation device 300 can estimate the location of the user by using the sequential magnetic field values outputted from the magnetic field sensor part 310 as input values for the location estimation model (operation S330). The movement path of the user corresponding to the continuously changing magnetic field values in the indoor space converges to one, so that although the output values of the location estimator part 330, i.e. the output coordinates, for the initial magnetic field values may not agree exactly with the actual location of the user, the output values of the location estimator part 330 after a continuous input of magnetic field values may lie within a comparatively small error range with respect to the actual location of the user.

The location output part 350 of the location estimation device 300 can provide the user with the location of the user estimated by the location estimator part 330 via a particular display device (operation S350). For instance, the location output part 350 can display the estimated location of the user or the estimated movement path of the user on at least a portion of a map of the indoor space for which the location estimation is performed.

Also, since the location estimation model installed on the location estimation device 300 is a location estimation model generated by the location estimation model generator device 100, the location estimation method can further include the location estimation device 300 obtaining the location estimation model in the form of an install file from the location estimation model generator device 100 or via a separate server and installing the downloaded install file to install the location estimation model onto the location estimation device 300.

Figure 14:
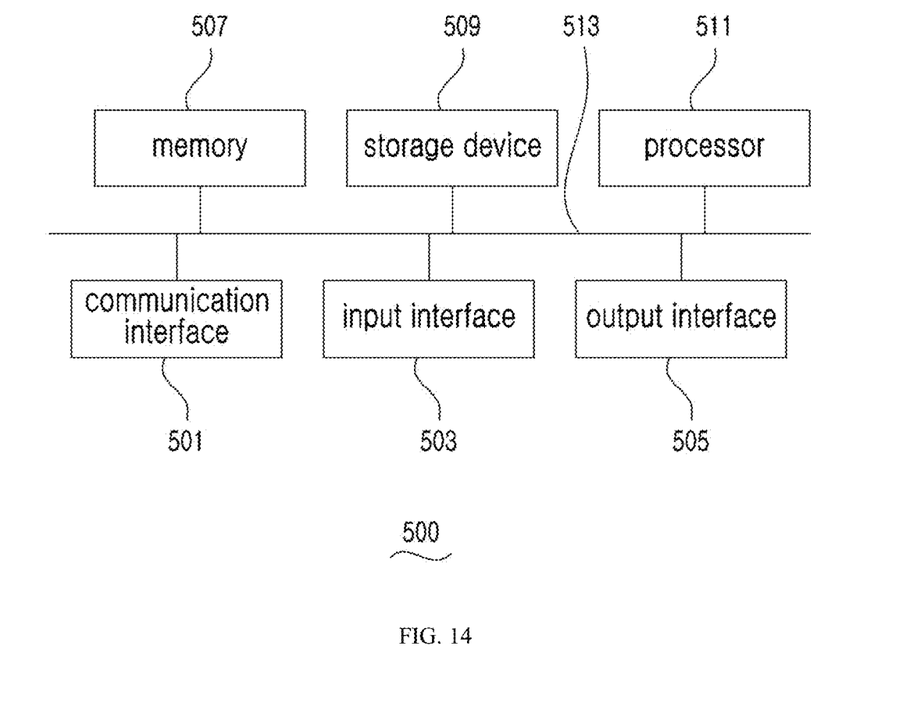
FIG. 14 is a block diagram illustrating a hardware example applicable as the location estimation model generator device shown in FIG. 10 or the location estimation device shown in FIG. 11.

FIG. 14 is a block diagram illustrating a hardware example applicable as the location estimation model generator device shown in FIG. 10 or the location estimation device shown in FIG. 11.

A computing device 500, which may serve as an implementation example of the location estimation model generator device shown in FIG. 10 or the location estimation device shown in FIG. 11, may include a communication interface 501, an input interface 503, an output interface 505, a memory 507, a storage device 509, at least one processor 511, and a system bus/control bus 513.

The communication interface 501 may be configured to allow communication with devices external to the computing device 500. The communication interface 501 can be configured for wired or wireless communication and can include, for example, a MAC chip that enables connection to a wireless LAN or wired LAN.

The input interface 503 can receive user input for controlling the computing device 500 and/or magnetic field values for location estimation. The input interface 503 can include a keyboard, touch pad, mouse, magnetic field sensor, and the like.

The output interface 505 can output the results of operations by the computing device 500, such as, for example, the result of generating the magnetic field map, the learning result of the recurrent neural network, the evaluation result of the recurrent neural network, and the result of the location estimation. The output interface 505 can include a display, speaker, and the like.

The memory 507 may include volatile memory and/or non-volatile memory. The memory 507 may store various data and programs temporarily or non-temporarily. A volatile memory can temporarily store segments of various data and programs, and a non-volatile memory can non-temporarily store various setup data and booting programs, etc., required for setup or booting.

The storage device 509 may be a high-capacity storage medium and may store various data and various programs. The storage device 509 may include at least a program that may be executed to perform a method for generating a location estimation model or a location estimation method according to an embodiment of the present invention. The storage device 509 may include data used by the program for the method for generating a location estimation model or the location estimation method. Such data can be accessed and managed by a particular program. The data used for the generation of a location estimation model and for the location estimation as well as said particular program may advantageously be configured as a database. A hard disk drive (HDD) and a solid-state drive (SSD) are some examples of a storage device 509.

The processor 511 can load and execute program code for a program stored in the non-volatile memory or the storage device 509. The processor 511 can include an execution unit capable of executing the instructions of the program code and can execute programs for generating the location estimation model or estimating the location, programs for training the various data used for the location estimation model generation or location estimation, and other programs.

The system bus/control bus 513 may be configured to transmit and receive control signals or data signals to and from different hardware blocks. The system bus/control bus 513 can be a parallel bus, a serial bus, or the like.

While the present invention is described above with reference to embodiments illustrated in the drawings, such embodiments are examples only, and the person having ordinary skill in the art would understand that numerous variations and other equivalent embodiments can be derived from such embodiments. Therefore, the true scope of protection of the present invention is to be defined by the technical spirit conveyed in the appended claims.

What is claimed is:

1. A device that generates a location estimation model, the device comprising:
   a map generator part configured to generate a magnetic field map, the magnetic field map including magnetic field values corresponding respectively to coordinates of an indoor space;
   a data generator part configured to generate virtual paths of movements of a pedestrian in the indoor space, and generate learning data by using the magnetic field map; and
   a learning part configured to generate the location estimation model by artificial neural network (ANN) learning using the learning data,
   wherein the learning part iterates learning until an output result of the ANN achieves a target error rate, and
   wherein a total number of epochs decreases as a total number of hidden nodes increases, until the target error rate is achieved.

2. The device according to claim 1, wherein the magnetic field map is generated by using linear interpolation.

3. The device according to claim 1, wherein the data generator part generates the virtual paths and generates the learning data including a coordinate and a magnetic field value of each point on the virtual path.

4. The device according to claim 3, wherein the learning data is divided into a plurality of mini-batches having a predetermined batch size.

5. The device according to claim 1, wherein the artificial neural network is a recurrent neural network (RNN).

6. The device according to claim 1, further comprising:
   a model evaluator part configured to evaluate an error rate of the location estimation model by using evaluation data generated by the data generator part.

7. A method, comprising:
   generating a magnetic field map from magnetic field values corresponding to coordinates of an indoor space by using linear interpolation, the generating of the magnetic field map performed by a map generator part of a location estimation model generator device;

generating learning data including coordinates of each point included in a virtual path of a pedestrian by using the magnetic field map, the generating of the learning data performed by a data generator part of the location estimation model generator device; and generating a location estimation model by recurrent neural network learning using the learning data, the generating of the location estimation model performed by a learning part of the location estimation model generator device, wherein the generating of the learning data comprises iterating learning until an output result of the recurrent neural network achieves a target error rate, and wherein a total number of epochs decreases as a total number of hidden nodes increases, until the target error rate is achieved.

8. The method according to claim 7, wherein the generating of the learning data comprises:

generating the virtual path in the indoor space and generating the learning data including a coordinate and a magnetic field value of each point on the virtual path.

9. The method according to claim 8, wherein the learning data is divided into a plurality of mini-batches having a predetermined batch size.

10. The method according to claim 7, further comprising:

evaluating an error rate of the location estimation model by using evaluation data generated by the data generator part, the evaluating performed by a model evaluator part of the location estimation model generator device.

11. A location estimation device having stored therein the location estimation model generated by the method of claim 7, the location estimation device comprising:

a magnetic field sensor part configured to measure magnetic field values as the magnetic field values change according to a movement of a user within the indoor space;

a location estimator part configured to estimate a location of the user by inputting a series of magnetic field values measured by the magnetic field sensor part into the location estimation model; and a location output part configured to output the location of the user estimated by the location estimator part.

12. The location estimation device according to claim 11, wherein the location estimation device is a smart phone, a mobile phone, or a tablet personal computer (PC).

13. A location estimation device, comprising:

a magnetic field sensor part configured to measure continuous three-dimensional magnetic field values in predetermined intervals as the magnetic field values change according to a movement of a user within an indoor space;

a location estimator part configured to estimate a current location of the user by inputting the continuous three-dimensional magnetic field values measured by the magnetic field sensor part into a learned artificial neural network (ANN); and a location output part configured to output the current location of the user estimated by the location estimator part, wherein learning of the ANN is implemented until an output of the ANN achieves a target error rate, and wherein a total number of epochs decreases as a total number of hidden nodes increases, until the target error rate is achieved.

* * * * *